US011298819B2

(12) United States Patent
Nakata et al.

(10) Patent No.: US 11,298,819 B2
(45) Date of Patent: Apr. 12, 2022

(54) ROBOT CONTROL METHOD

(71) Applicant: Panasonic Intellectual Property Management Co., Ltd., Osaka (JP)

(72) Inventors: Hiroyuki Nakata, Osaka (JP); Atsumi Hashimoto, Osaka (JP); Ryosuke Yamamoto, Osaka (JP); Yasuyoshi Honuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 254 days.

(21) Appl. No.: 16/548,295

(22) Filed: Aug. 22, 2019

(65) Prior Publication Data

US 2019/0375098 A1    Dec. 12, 2019

Related U.S. Application Data

(63) Continuation of application No. PCT/JP2018/005643, filed on Feb. 19, 2018.

(30) Foreign Application Priority Data

Mar. 1, 2017    (JP) .............................. JP2017-038341

(51) Int. Cl.
*B25J 9/16*    (2006.01)
*H02P 29/62*    (2016.01)
(Continued)

(52) U.S. Cl.
CPC .......... *B25J 9/1628* (2013.01); *B25J 9/1674* (2013.01); *B25J 9/1694* (2013.01);
(Continued)

(58) Field of Classification Search
CPC ...... B25J 9/1628; B25J 9/1694; B25J 9/1641; H02P 21/0089; H02P 21/22; H02P 29/62;
(Continued)

(56) References Cited

U.S. PATENT DOCUMENTS 5,825,150 A * 10/1998 Kachi ................ G05B 19/4062
318/610
2005/0168186 A1 * 8/2005 Matsubara .............. H02P 21/22
318/575
(Continued)

FOREIGN PATENT DOCUMENTS

EP         1 562 283        8/2005
JP         2004-352090     12/2004
(Continued)

OTHER PUBLICATIONS

Extended European Search Report dated Dec. 10, 2019 in corresponding European Patent Application No. 18760661.1.
(Continued)

*Primary Examiner* — Bickey Dhakal
(74) *Attorney, Agent, or Firm* — Wenderoth, Lind & Ponack, L.L.P.

(57) ABSTRACT

A robot control method of controlling motion of a robot arm by using a servo motor includes adding d-axis electric current to a motor electric current command (steps 15-6, 15-8) if external temperature is less than or equal to a predetermined value (step 15-3), and if an absolute value of the motor electric current command is less than or equal to a predetermined value (step 15-4), and if a value of detected overload is less than or equal to a predetermined value (step 15-5).

1 Claim, 15 Drawing Sheets

(51) Int. Cl.
*H02P 21/22* (2016.01)
*H02P 21/00* (2016.01)
*H02P 29/64* (2016.01)

(52) U.S. Cl.
CPC .......... *H02P 21/0089* (2013.01); *H02P 21/22* (2016.02); *H02P 29/62* (2016.02); *H02P 29/64* (2016.02); *B25J 9/1641* (2013.01); *G05B 2219/39192* (2013.01)

(58) Field of Classification Search
CPC .......... H02P 9/107; G05B 2219/39181; G05B 2219/41154; G05B 2219/43022; G05B 19/4062; G05B 2219/14043
See application file for complete search history.

(56) References Cited

U.S. PATENT DOCUMENTS

2015/0256113 A1* 9/2015 Takase .................... H02P 27/04
318/400.02
2015/0277426 A1 10/2015 Ogata

FOREIGN PATENT DOCUMENTS

| | | |
|---|---|---|
| JP | 2005-219133 | 8/2005 |
| JP | 4292871 B | 7/2009 |
| JP | 2016-030403 | 3/2016 |

OTHER PUBLICATIONS

International Search Report of PCT application No. PCT/JP2018/005643 dated May 15, 2018.

* cited by examiner

ROBOT CONTROL METHOD

This application is a continuation of the PCT International Application No. PCT/JP2018/005643 filed on Feb. 19, 2018, which claims the benefit of foreign priority of Japanese patent application No. 2017-038341 filed on Mar. 1, 2017, the contents all of which are incorporated herein by reference.

TECHNICAL FIELD

The present disclosure relates to a robot control method, and a robot control method that decreases malfunction of a robot due to increase in viscous friction of grease for reduction gears at low temperature.

BACKGROUND ART

In control equipment in which servo motors are driven through reduction gears to operate the components, viscosity of grease used at the reduction gears (hereinafter referred to as "grease for reduction gears") may increase at low temperature below 5° C., and thus viscous friction may increase. In that situation, torque generated by the servo motors is cancelled out by the friction. Consequently, driving torque becomes insufficient, and thus sufficient performance may not be provided.

A method is proposed using which reactive component electric current (hereinafter referred to as d-axis electric current) is made to flow instead of electric current that generates torque of servo motors (hereinafter referred to as q-axis electric current). Consequently, the motors generate heat, and thus viscous friction of grease for reduction gears decreases (see PTL 1, for example).

CITATION LIST

Patent Literature

PTL 1: Japanese Patent No. 4292871

SUMMARY OF THE INVENTION

However, according to a technique of PTL 1 described above, magnitude of addition of d-axis electric current is determined based on a temperature sensor and magnitude of q-axis electric current. Therefore, if d-axis electric current has flowed by field weakening control, additional d-axis electric current is added. Consequently, apparent electric current (vector addition of q-axis electric current and d-axis electric current) may exceed an allowable maximum value, and thus magnets of motors may be demagnetized.

Further, a controller that controls a robot generally includes an overload detecting function not to allow overheating of motors due to overload caused by breakdown of reduction gears or contact with the outside. Apparent electric current is used to detect overload. Therefore, if the overload detecting function is not considered and d-axis electric current is added, the apparent electric current increases, and thus wrong overload detection may occur. Consequently, a robot may be stopped not to allow motors to overheat.

The present disclosure is made, considering the above problems. It is an object of the present disclosure to provide a robot control method that makes motors generate heat to decrease viscous friction of grease for reduction gears at low temperature without demagnetizing magnets of the motors and causing wrong overload detection.

To achieve the above object, according to a technique disclosed herein, d-axis electric current is added if an absolute value of a motor electric current command is less than or equal to a predetermined value and a level of detected overload is less than or equal to a predetermined value. Consequently, a motor generates heat, and thus friction of grease for reduction gears at low temperature is decreased without demagnetizing a magnet of the motor and causing overload. Therefore, viscous friction of grease for reduction gears at low temperature is decreased without allowing apparent electric current to exceed an allowable maximum value, and causing stop of a robot due to wrong overload detection.

As described above, a robot control method according to the present disclosure makes a motor generate heat to decrease viscous friction of grease for reduction gears at low temperature without demagnetizing a magnet of the motor and causing wrong overload.

DESCRIPTION OF EMBODIMENT

Hereinafter, an exemplary embodiment will be described in detail with reference to the drawings. The following preferred exemplary embodiment is essentially an example.

Figure 1:
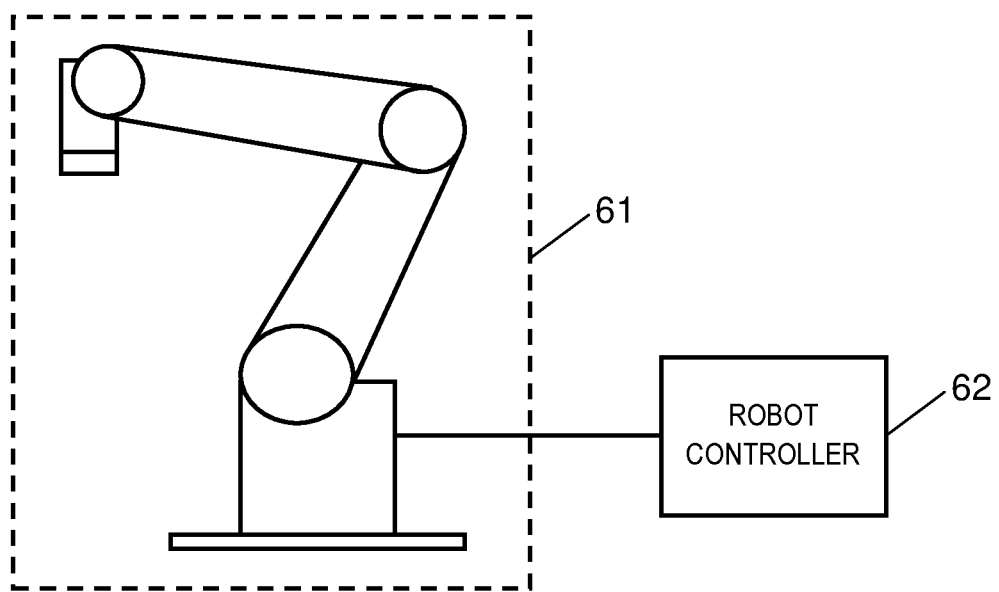
FIG. 1 is a schematic view that illustrates a configuration of a 6-axis vertical articulated robot according to an exemplary embodiment.

FIG. 1 is a schematic view that illustrates a configuration of a 6-axis vertical articulated robot according to the exemplary embodiment. As illustrated in FIG. 1, the 6-axis vertical articulated robot includes robotic mechanism 61 and robot controller 62. Robotic mechanism 61 includes a plurality of arms and joint axes (not shown), and uses reduction gears disposed near the joint axes, respectively, to drive the arms.

Figure 2:
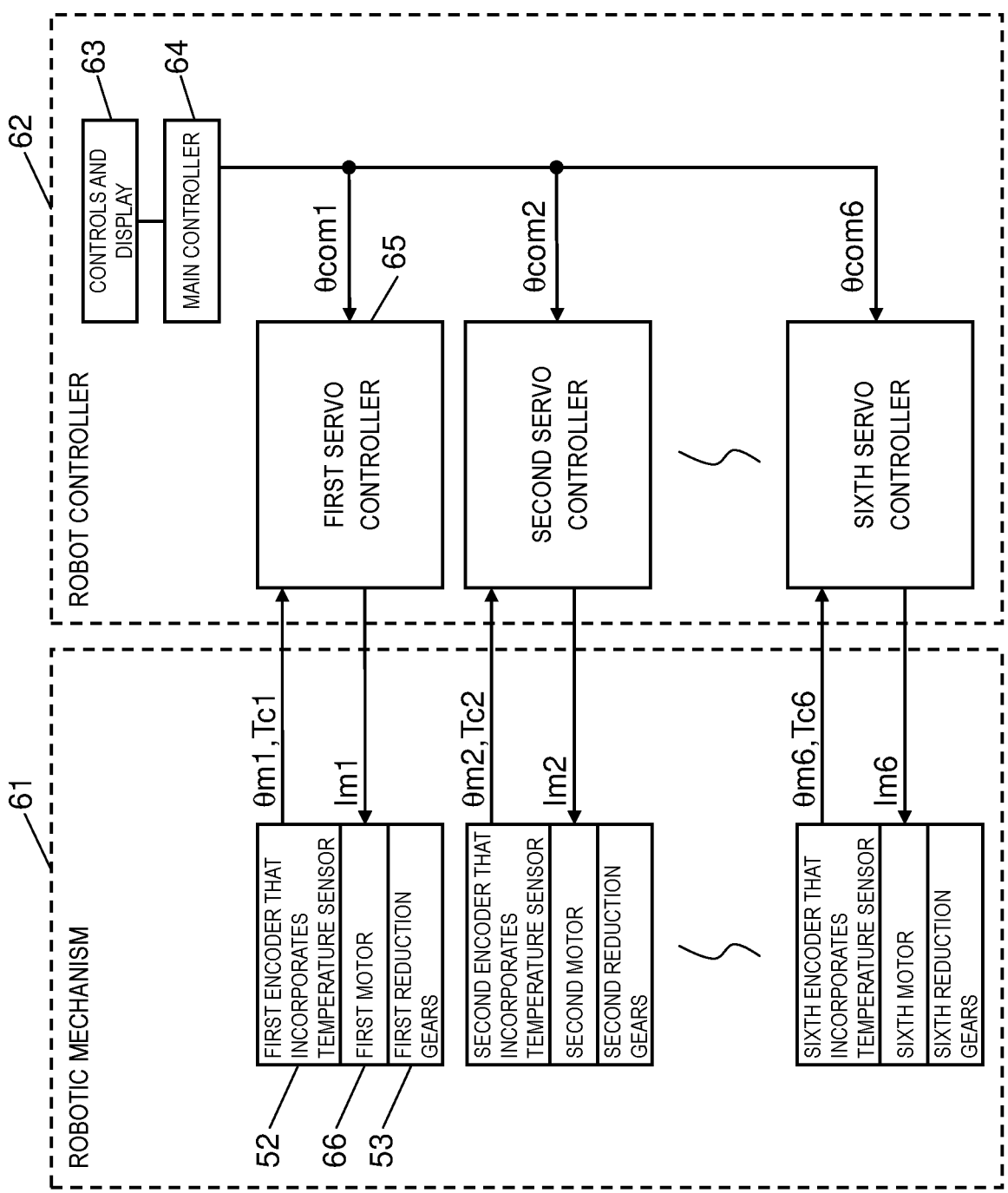
FIG. 2 is a block diagram that illustrates a configuration related to position control of the vertical articulated robot according to the present exemplary embodiment.

FIG. 2 is a block diagram that illustrates an interior configuration of robotic mechanism 61 and robot controller 62. Hereinafter, a configuration related to control of position of the 6-axis vertical articulated robot will be especially described.

As illustrated in FIG. 2, robot controller 62 contains controls and display 63, main controller 64, and first servo controller 65, and second to sixth servo controllers. Controls and display 63 receives instructions on motion of the arms and the like of robotic mechanism 61. Main controller 64 stores trajectories of motion of the arms and the like of robotic mechanism 61. When controls and display 63 receives instructions, the controls and display 63 outputs position commands θcom1 to θcom6 on positions of the axes (six axes, for example) of the robot to the axes of the robot, based on trajectories of motion that correspond to the received instructions. Based on the position commands, first servo controller 65 and the second to sixth servo controllers of the axes of the robot control first motor 66 and second to sixth motors within robotic mechanism 61, respectively. Reduction gears 53 are provided for each of the motors.

A conventional servo controller will be described before servo controller 65 according to the present exemplary embodiment is described.

Figure 3:
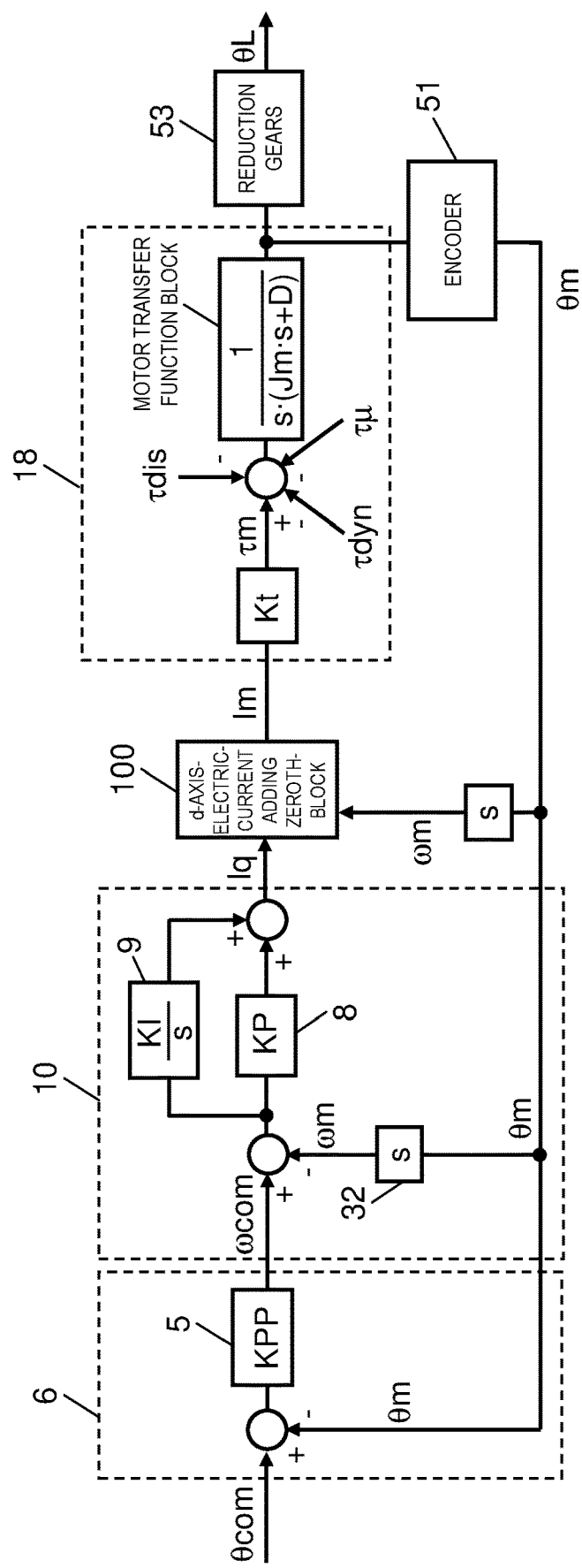
FIG. 3 is a block diagram that illustrates a configuration of a conventional servo controller.

FIG. 3 is a block diagram that illustrates a configuration of the conventional servo controller. Position control block 6 generates velocity loop command ωcom by multiplying a difference between position command θcom and motor position feedback θm by position proportional gain 5. Position control block 6 receives motor position feedback θm from encoder 51 that is a position sensor attached to a motor.

Velocity control block 10 multiplies a difference between velocity loop command ωcom and motor velocity feedback ωm by velocity proportional gain 8. Velocity control block 10 determines motor velocity feetback ωm by differentiating motor position feedback θm with respect to derivative element 32. Velocity control block 10 multiplies an integral of the difference by velocity integral gain 9. Velocity control block 10 generates motor torque electric current command Iq by adding the multiplied integral to the difference multiplied by velocity proportional gain 8.

Field weakening control may be necessary to rotate the motor at high velocity. The field weakening control weakens counter-electromotive force in the motor that increases in proportion to rotation of the motor. That is, a difference between the counter-electromotive force in the motor and voltage of a power source is maintained. Therefore, electric current flows through the motor, and thus the motor is rotated.

The field weakening control is generally performed by vector addition of motor torque electric current command Iq and field weakening electric current command Id0 for a motor reactive electric current component. At that time, motor command electric current Im is calculated using Equation (1).

$$Im = Iq + j \times Id0 \quad (1)$$

where j is imaginary unit (that represents a reactive component).

Figure 4:
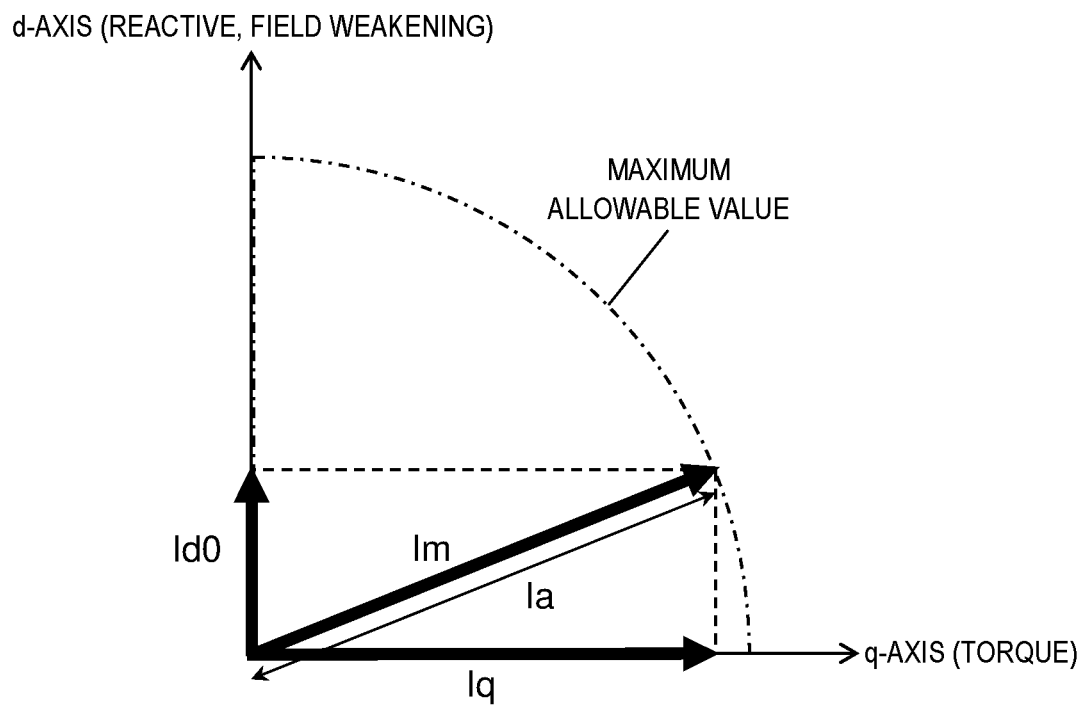
FIG. 4 illustrates vectors of conventional motor command electric current Im.
Figure 5:
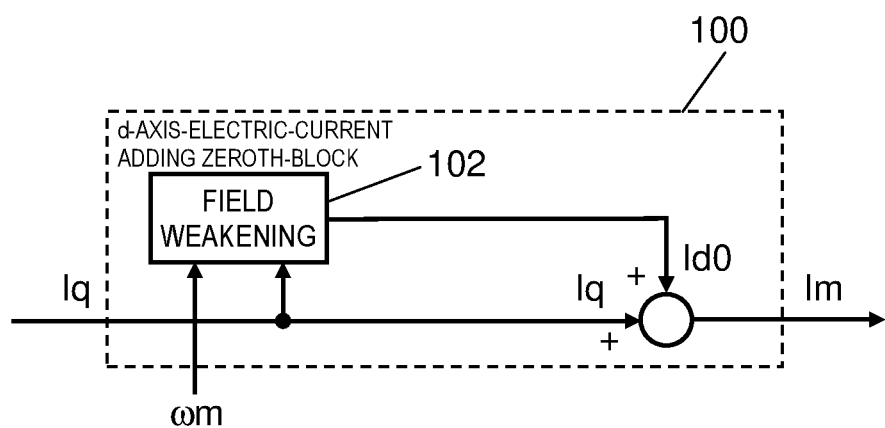
FIG. 5 illustrates a d-axis adding zeroth-block in FIG. 3 in detail.

The calculation is performed in d-axis-electric-current adding zeroth-block 100 in FIG. 3. FIG. 4 expresses Equation (1) as a vector diagram. FIG. 5 is a block diagram that illustrates d-axis-electric-current adding zeroth-block 100 in detail.

As illustrated in FIG. 5, motor velocity feedback ωm and motor torque electric current command Iq are used to calculate field weakening electric current command Id0. If velocity and torque of rotation of motor increase, effect of field weakening needs to be increased (counter-electromotive force in the motor needs to be decreased further). To increase the effect of field weakening, field weakening electric current command Id0 needs to be increased. For example, field weakening electric current command Id0 is calculated using Equation (2) as follows:

$$Id0 = k1 \times \omega m + k2 \times Iq \quad (2)$$

where k1 is a coefficient of proportionality for velocity and k2 is a coefficient of proportionality for torque.

If a robot is stopped, ωm may be zero and Iq may be zero, and thus Id0 may be zero and Im may be zero at an axis to which gravity is not applied. In that case, electric current does not flow through the motor, and the motor does not generate heat. If grease for reduction gears hardens at low temperature, the grease for reduction gears is not heated.

In a method proposed in PTL 1, value Id1 of addition of d-axis electric current is determined based on a temperature sensor and motor torque electric current command Iq. Consequently, reactive electric current component flows through a motor and the motor generates heat even when the motor is stopped. Consequently, grease for reduction gears is heated, and viscous friction of the grease for reduction gears is decreased.

Figure 6:
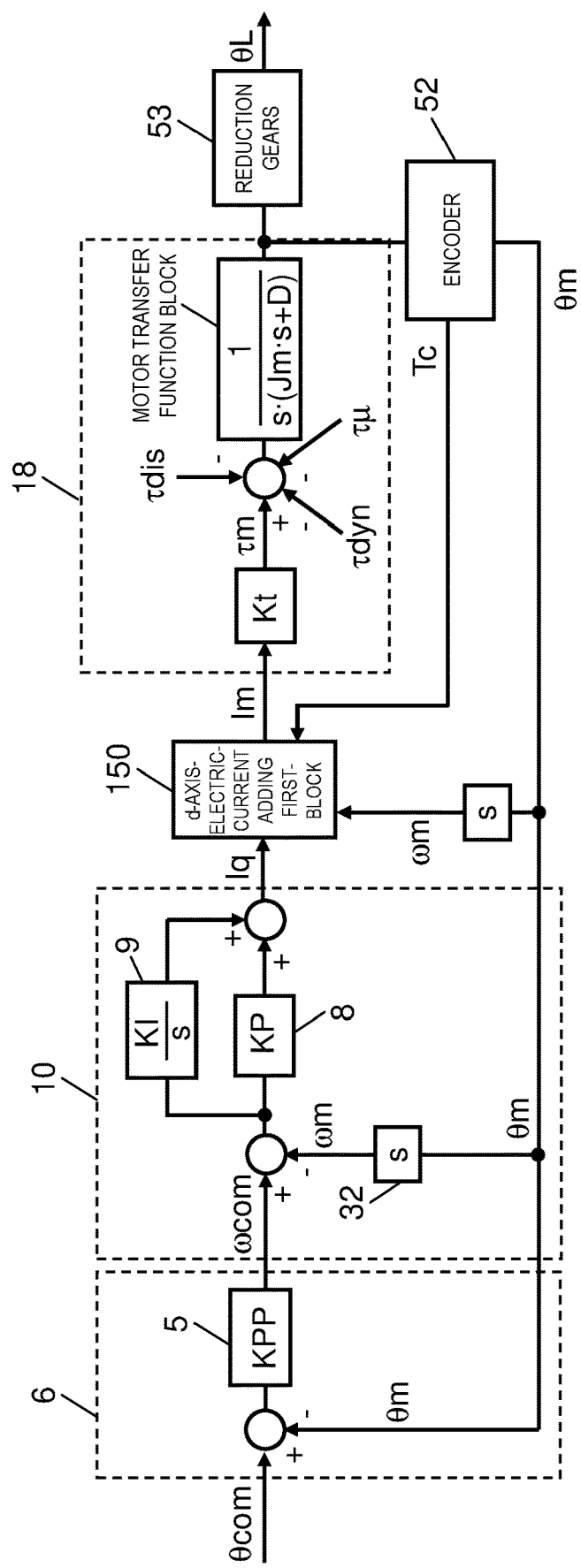
FIG. 6 is a block diagram that illustrates a configuration of a conventional servo controller.

FIG. 6 is a block diagram that illustrates a configuration of a conventional servo controller. Differences between FIG. 6 and FIG. 3 are that encoder 52 incorporates a temperature sensor, and outputs value Tc of the temperature sensor, and d-axis-electric-current adding first-block 150 is provided instead of d-axis-electric-current adding zeroth-block 100.

Figure 7:
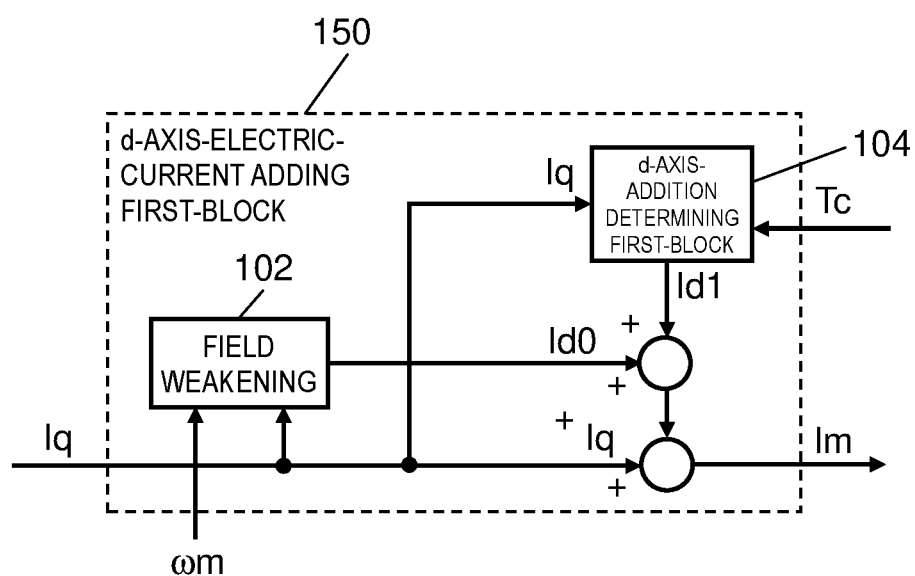
FIG. 7 illustrates a d-axis adding first-block in FIG. 6 in detail.
Figure 8:
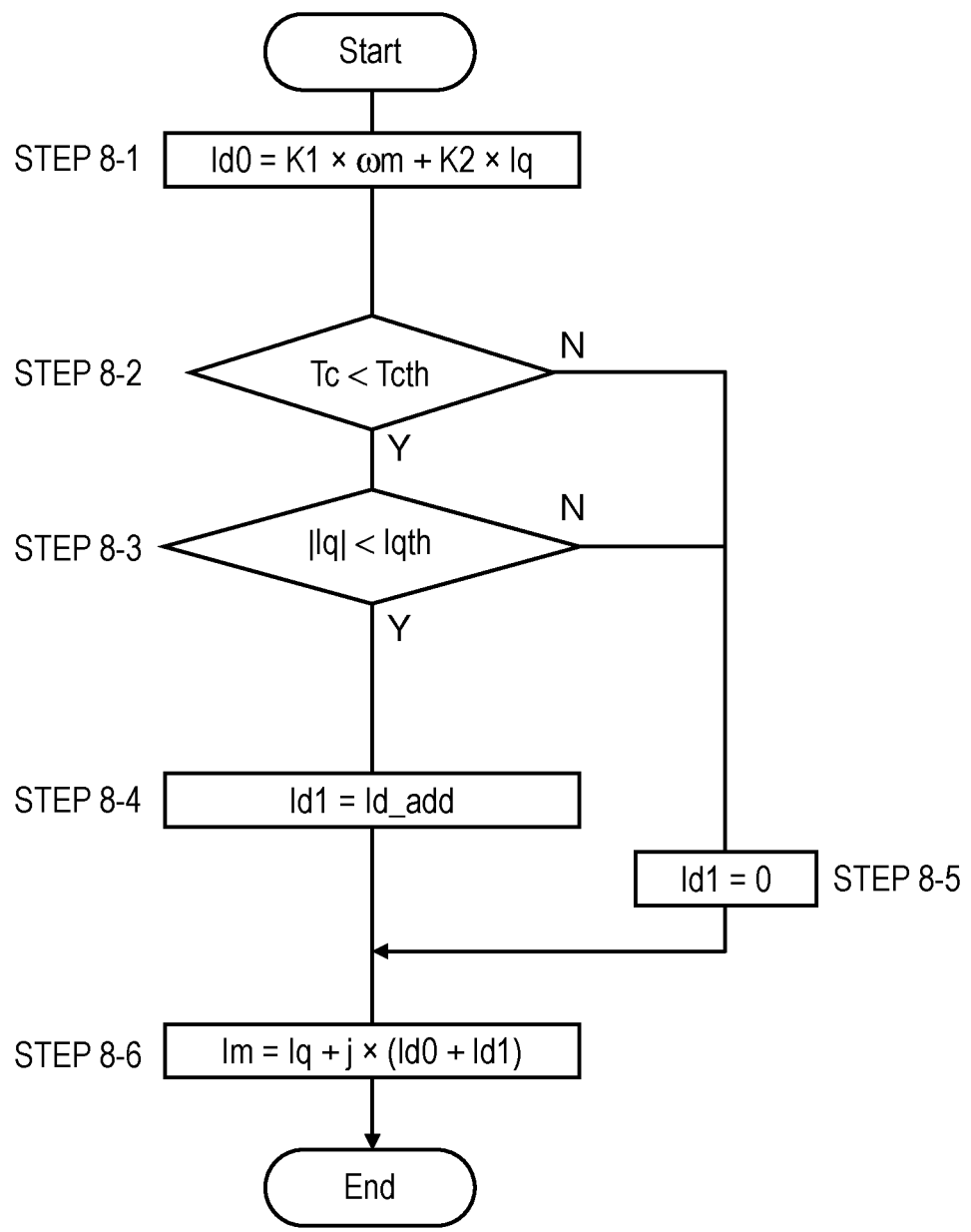
FIG. 8 is a flowchart that illustrates operation in FIG. 7.

FIG. 7 is a block diagram that illustrates d-axis-electric-current adding first-block 150 in detail. FIG. 8 is a flowchart that illustrates operation of d-axis-electric-current adding first-block 150.

In step 8-1 in FIG. 8, field weakening electric current command Id0 is calculated. Step 8-1 is performed in field weakening block 102 in FIG. 7.

In step 8-2, it is determined whether value Tc of the temperature sensor is less than threshold Tcth of the temperature sensor. If value Tc of the temperature sensor is less than threshold Tcth of the temperature sensor, step 8-3 is performed. If value Tc of the temperature sensor is not less than threshold Tcth of the temperature sensor, step 8-5 is performed.

In step 8-3, it is determined whether an absolute value of motor torque electric current command Iq is less than motor torque electric current threshold Iqth. If the absolute value of motor torque electric current command Iq is less than motor torque electric current threshold Iqth, step 8-4 is performed. If the absolute value of motor torque electric current command Iq is not less than motor torque electric current threshold Iqth, step 8-5 is performed.

In step 8-4, value Id_add assigned to a value of addition of d-axis electric current is assigned to value Id1 of addition of d-axis electric current.

On the other hand, in step 8-5, "zero" is assigned to value Id1 of addition of axis electric current.

Steps 8-2 to 8-5 are performed in d-axis-addition determining first-block 104 in FIG. 7.

In step 8-6, motor command electric current Im is calculated using Equation (3) as follows:

$$Im = Iq + j \times (Id0 + Id1) \qquad (3)$$

Figure 9:
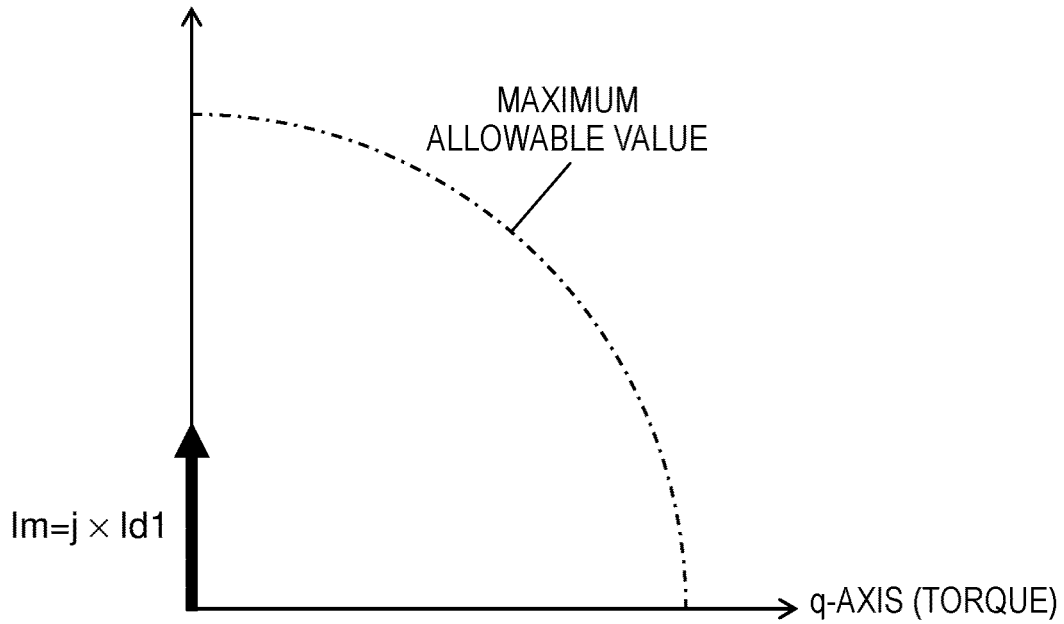
FIG. 9 illustrates a vector of conventional motor command electric current.

FIG. 9 illustrates a vector diagram in which ωm=0, Iq=0, and Id0=0 are satisfied (that is, a robot is stopped and gravity is not applied), and value Tc output from a temperature sensor is less than Tcth, that is, temperature is low. At that time, motor command electric current Im=j×Id1 is satisfied, based on Equations (2) and (3). Therefore, reactive component electric current flows through a motor, and the motor is heated.

The heated motor heats grease for reduction gears that hardens at low temperature. Consequently, viscous friction of the grease for reduction gears is decreased.

If d-axis electric current has flowed by field weakening (Id0≠0), however, the method may allow motor command electric current Im to exceed a maximum allowable value or may cause wrong overload.

Absolute value Ia of motor command electric current Im is calculated using Equation (4) as follows:

$$Ia = |Im| = \sqrt{(Iq^2 + (Id0 + Id1)^2)} \qquad (4)$$

A motor has a maximum allowable value for electric current that flows through the motor. If an absolute value of electric current through the motor exceeds the maximum allowable value, winding of the motor may be damaged, or a magnet of the motor may be demagnetized.

Before value Id1 of addition of d-axis electric current is added, absolute value Ia of motor command electric current Im may have reached the maximum allowable value. Even if an absolute value of motor torque electric current command Iq is less than motor torque electric current threshold Iqth, absolute value Ia of motor command electric current Im may reach a maximum allowable value for Im after field weakening electric current command Id0 is added.

Figure 10:
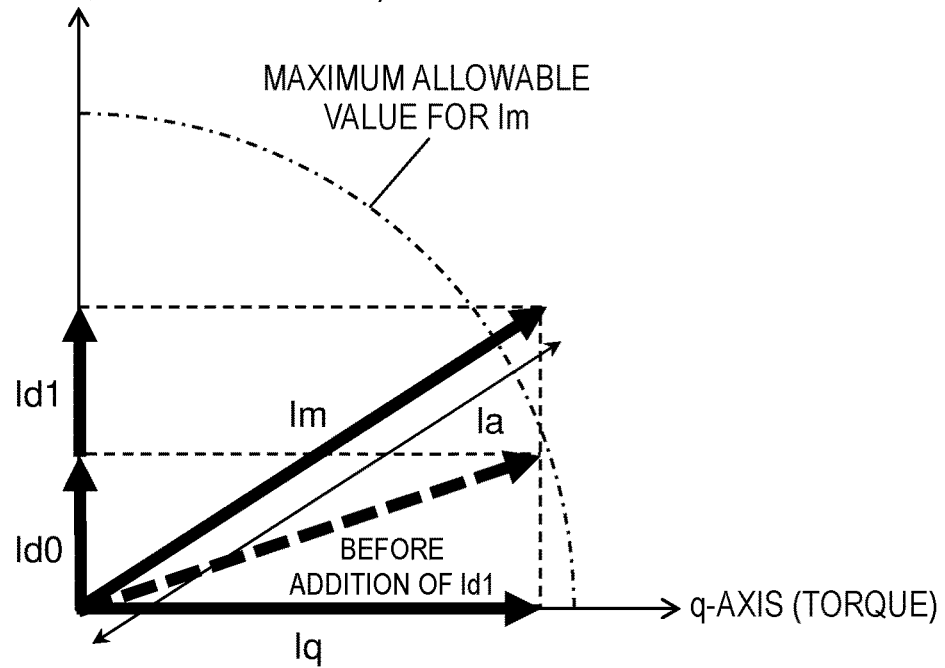
FIG. 10 illustrates a situation where conventional motor command electric current exceeds a maximum allowable value.

In such a situation, if value Id1 of addition of d-axis electric current that is reactive electric current for dealing with the low temperature is added, absolute value Ia of motor command electric current Im exceeds the maximum allowable value for Im, as illustrated in FIG. 10.

That is, if value Id1 of addition of d-axis electric current is determined by only monitoring motor torque electric current command Iq, as in PTL 1, absolute value Ia of motor command electric current Im may exceed the maximum allowable value for Im. Consequently, winding of the motor may be damaged, or a magnet of the motor may be demagnetized.

Next, an overload detecting function will be described. The overload detecting function detects overload. Consequently, an integral of absolute value Ia of motor command electric current Im over time does not exceed a limit. The limit is a limit on rise in temperature of winding of a motor.

Figure 12:
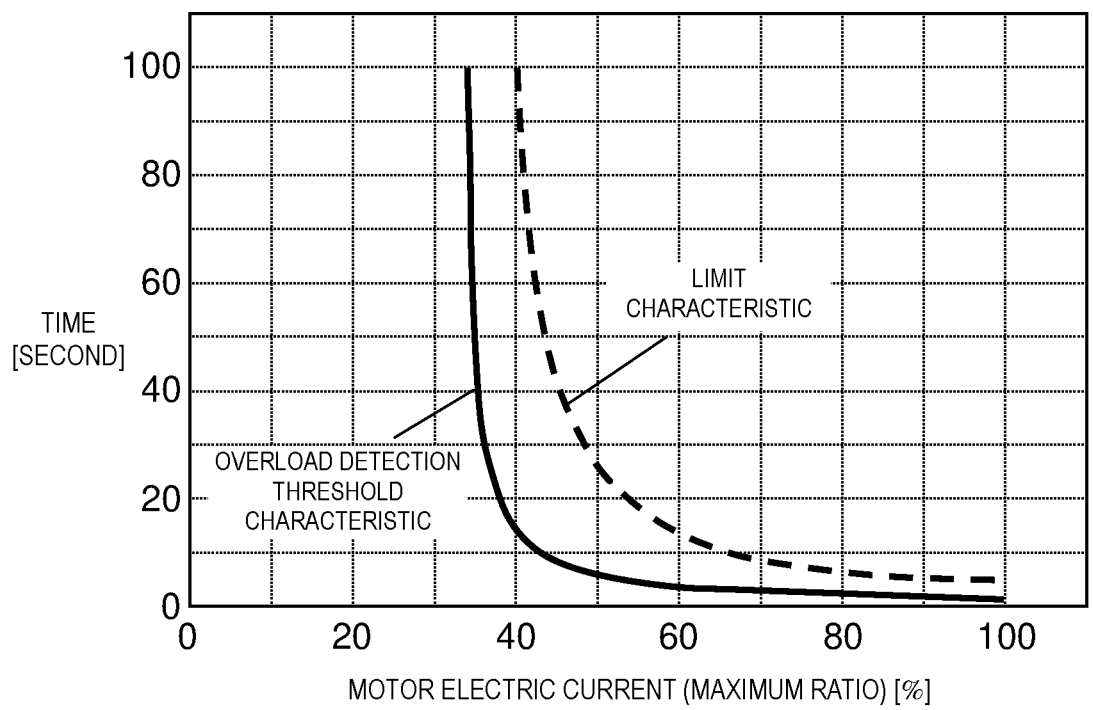
FIG. 12 illustrates a motor-time-limit curve according to the present exemplary embodiment.

FIG. 12 illustrates a motor-time-limit-characteristic curve. A vertical axis of the motor-time-limit-characteristic curve represents a period of time during which motor electric current is output. A horizontal axis of the motor-time-limit-characteristic curve represents a value of motor electric current (maximum ratio). A broken line in FIG. 12 represents limit characteristic. The limit characteristic represents a time when temperature of winding of the motor rises to a limit, and a value of motor electric current at that time. That is, if a value of motor electric current is 40%, a time when temperature of a motor rises to a limit is a time when a period of time during which motor electric current is output reaches about 100 seconds. If a value of motor electric current is 50%, a time when temperature of a motor rises to a limit is a time when a period of time during which motor electric current is output reaches about 25 seconds. If a value of motor electric current is 70%, a time when a temperature of a motor rises to a limit is a time when a period of time during which motor electric current is output reaches about 8 seconds.

The overload detecting function detects overload. Consequently, an integral of absolute value Ia of motor command electric current Im over time is less than or equal to the limit.

Figure 11:
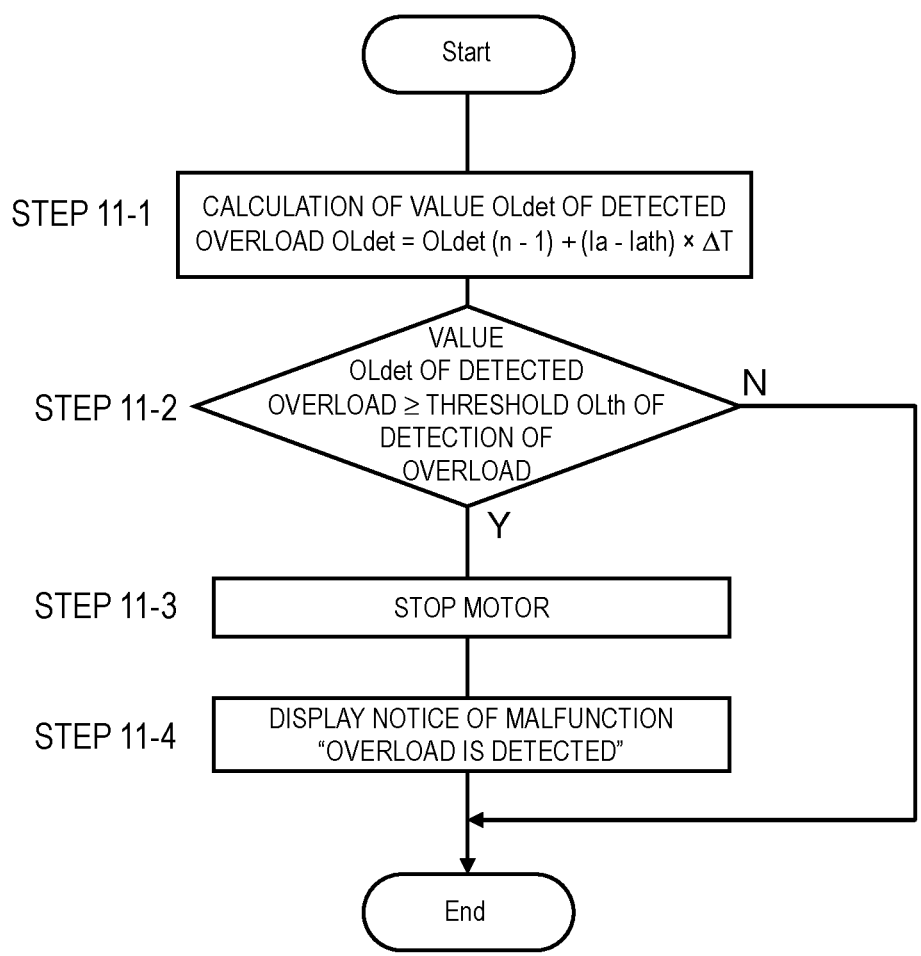
FIG. 11 is a flowchart of detection of overload according to the present exemplary embodiment.

FIG. 11 is a flowchart of detection of overload. The process is performed at regular intervals ΔT.

In step 11-1, value OLdet of detected overload is determined using Equation (5) as follows:

$$OLdet = OLdet(n-1) + (Ia - Iath) \times \Delta T \qquad (5)$$

where Iath is a threshold of electric current of detection of overload, and

ΔT is an interval at which detection of overload is performed.

In Equation (5), OLdet(n−1) is a value (OLdet) of detected overload that has been detected one interval before.

In step 11-2, value OLdet of detected overload is compared with first threshold OLth of overload. If a condition of Inequality (6) is satisfied, overload is determined.

$$OLdet \geq OLth \qquad (6)$$

If determination is "Y" in step 11-2, overload is determined, and the motor is stopped in step 11-3. Further, in step 11-4, notice of malfunction is displayed, and a process of detecting overload is finished. The display of notice of malfunction is display of a message "overload is detected" on controls and display 63 in FIG. 2 to notify a user of malfunction.

If determination is "N" in step 11-2, no overload is determined, and the process of detecting overload is finished.

In FIG. 12, a solid line represents overload detection threshold characteristic. For example, the overload detection threshold characteristic represents time and value of motor electric current (maximum ratio) that satisfy OLdet=OLth in Inequality (6) if Iath=33 and OLth=100. The overload detection threshold characteristic (solid line) is formed below the limit characteristic (broken line). This indicates that a method of calculating value OLdet of detected overload in Equation (5) is appropriate.

A problem of viscous friction of grease for reduction gears at low temperature will be described with reference to FIG. 6.

Block 18 that illustrates a motor and external force in FIG. 6 is expressed as numerical expressions in Equations (7) and (8) described later. Supposing reduction gears 53 are rigid bodies, torque τm generated by the motor, on a side driven by the motor, is expressed by Equation (7), and torque τm generated by the motor, on a load side, is expressed by Equation (8).

Iq is used instead of Im in Equation (7) because Iq is an active component for generation of torque. Since it is supposed that reduction gears 53 are rigid bodies, output position θL from which reduction gears output is a value calculated by only multiplying motor position feedback θm by gear ratio (coefficient of proportionality). Therefore, derivative ωm that is a derivative of position feedback θm of the motor is used instead of output position θL from which the reduction gears output in Equation (8).

$$\tau m = Kt \times Iq \tag{7}$$

$$\tau m = \tau dyn + \tau dis + Jm \times \alpha m + D \times \omega m + \tau \mu \tag{8}$$

where
Kt is a motor torque constant,
Iq is motor electric current,
αm is motor angular acceleration (derivative of ωm),
ωm is motor angular velocity,
Jm is motor inertia (rotor+first stage of reduction gears),
D is a viscous friction coefficient,
τμ is dynamic friction torque,
τdyn is dynamic torque (a sum of gravity torque, inertial force, centrifugal force, and Coriolis force), and
τdis is collision torque,
where dynamic friction torque τμ is calculated using Equation (9) as follows:

$$\tau \mu = K\mu \times sgn \tag{9}$$

where Kμ is magnitude of dynamic friction, and
sgn is 1 (ωm>0), 0 (ωm=0), or −1 (ωm<0).

If temperature falls, especially falls to 5° C. or lower, viscous friction coefficient D in Equation (8) significantly increases. Therefore, torque τm generated by the motor that is necessary to drive the load side increases, and thus motor torque electric current command Iq that generates torque τm increases. Consequently, absolute value Ia of motor command electric current Im calculated using Equation (4) also increases.

That is, even if a robot operates the same way, absolute value Ia of motor command electric current Im is higher at a low temperature that is lower than or equal to 5° C. than at a normal temperature that is approximately 20° C. Consequently, value OLdet of detected overload calculated using Inequality (6) also increases.

If value Id1 of addition of d-axis electric current is added to deal with the low temperature, absolute value Ia of motor command electric current Im increases further, and thus value OLdet of detected overload also increases further. If the condition of Inequality (6) is satisfied by the increase in value OLdet of detected overload, wrong overload detection occurs, and the control equipment stops.

Hereinafter, first servo controller 65 according to the present exemplary embodiment will be described to decrease viscous friction of grease for reduction gears at low temperature without demagnetizing a magnet of a motor and causing wrong overload detection.

Figure 13:
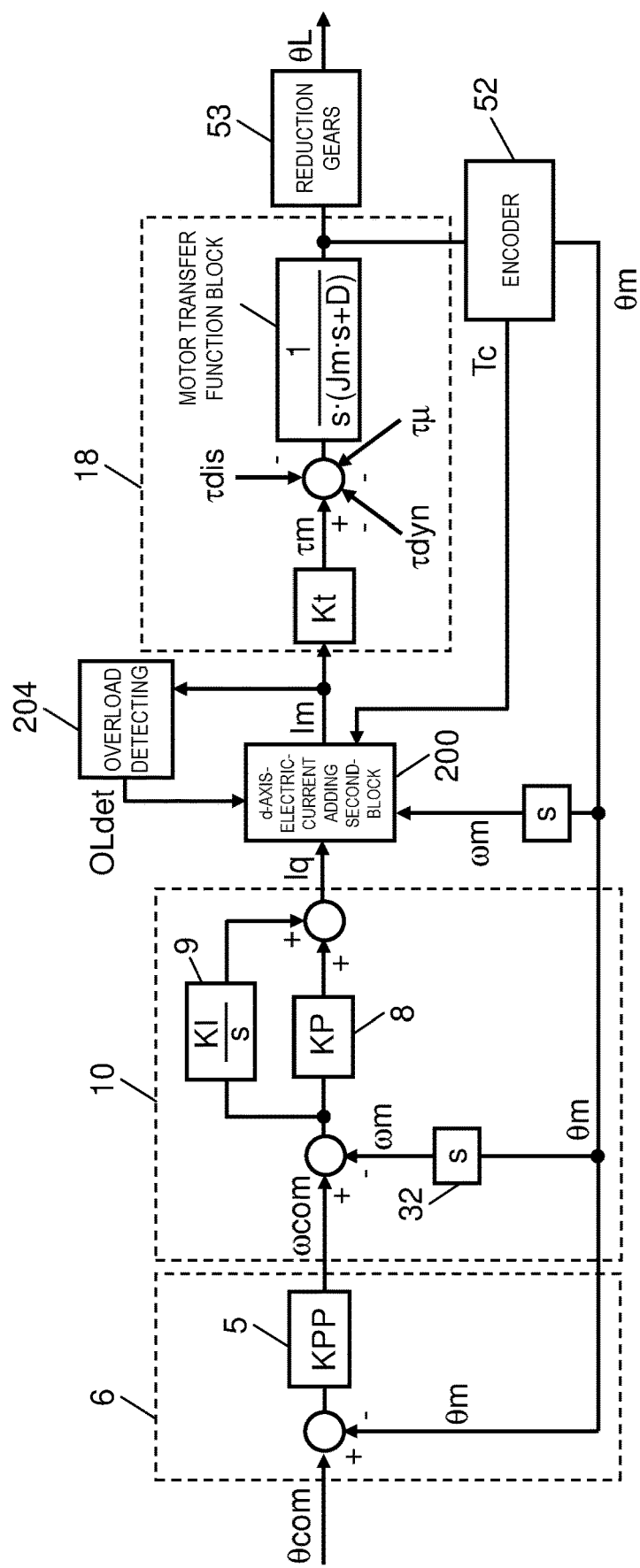
FIG. 13 is a block diagram that illustrates a configuration of a servo controller according to the present exemplary embodiment.

FIG. 13 is a block diagram that illustrates a configuration of first servo controller 65 according to the present exemplary embodiment. Differences between FIG. 13 and FIG. 6 are that overload detecting block 204 is added, and d-axis-electric-current adding second-block 200 is provided instead of d-axis-electric-current adding first-block 150.

Figure 14:
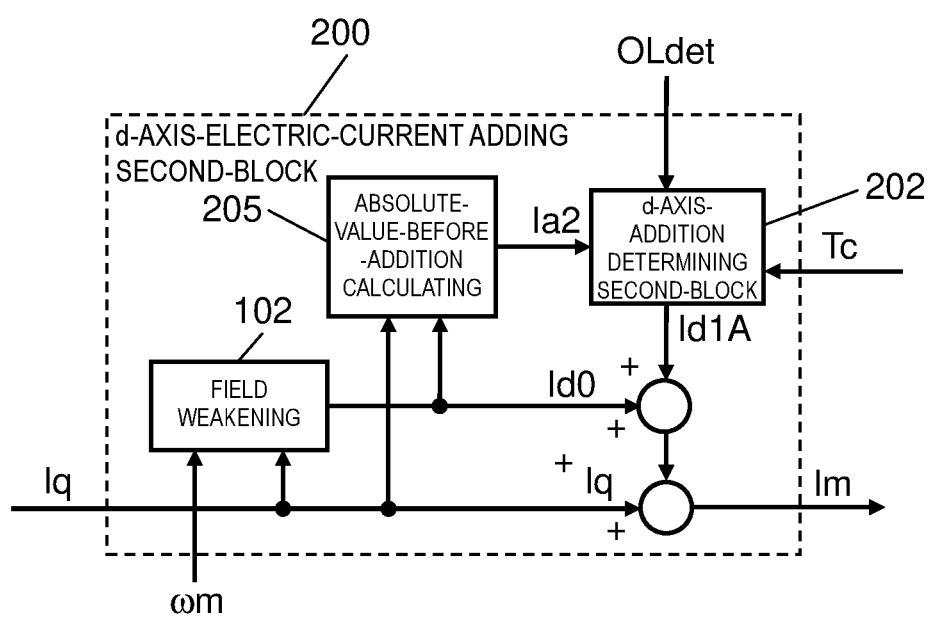
FIG. 14 illustrates a d-axis adding second-block in FIG. 13 in detail.

FIG. 14 is a block diagram that illustrates d-axis-electric-current adding second-block 200 in detail. A difference between FIG. 14 and FIG. 7 is that absolute-value-before-addition calculating block 205 is provided.

Figure 15:
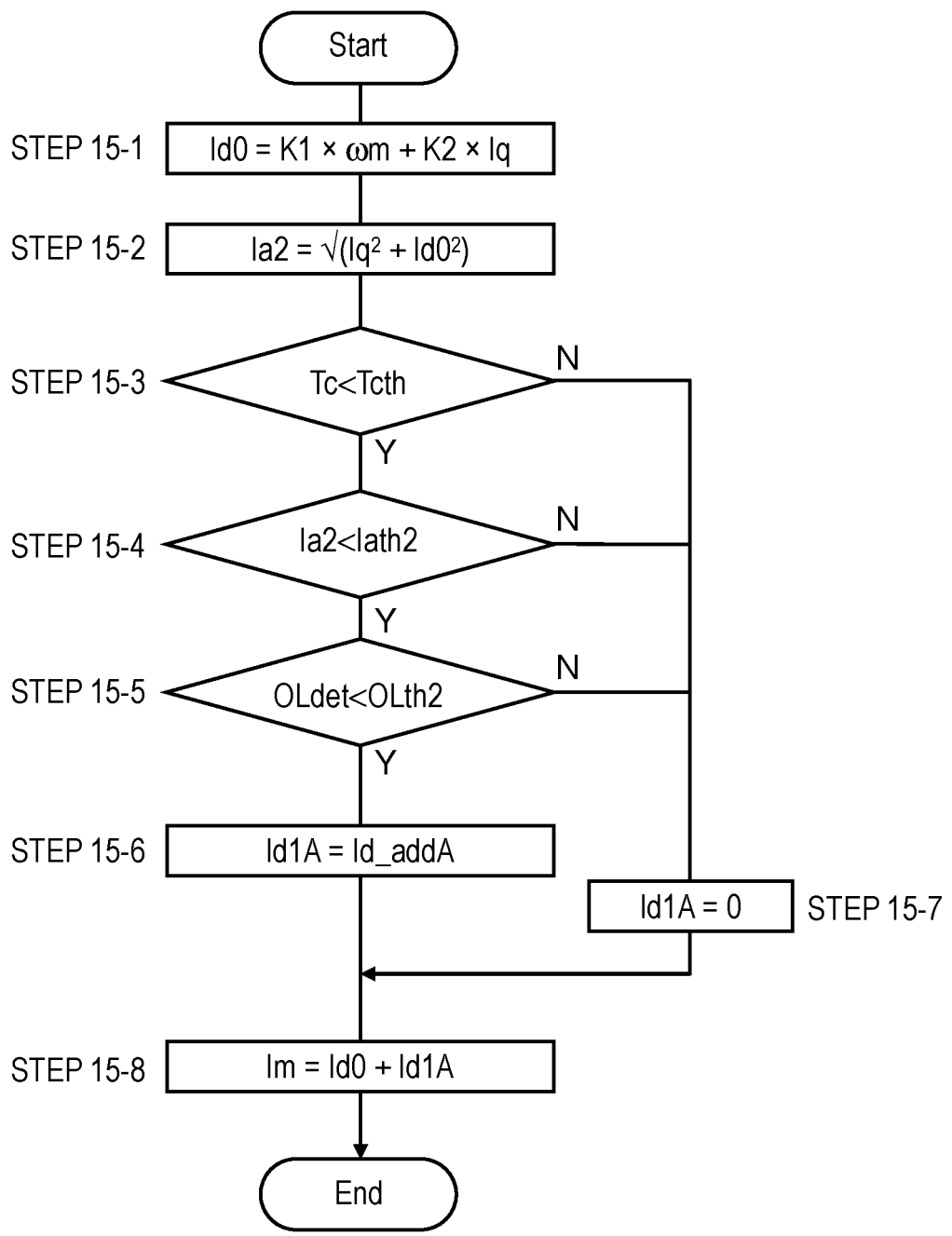
FIG. 15 is a flowchart that illustrates operation in FIG. 14.

FIG. 15 is a flowchart that illustrates operation in FIG. 14, that is, a robot control method according to the present exemplary embodiment In step 15-1, field weakening electric current command Id0 is calculated in field weakening block 102 in FIG. 14.

In step 15-2, absolute value Ia2 of motor command electric current Im before addition of d-axis electric current is determined (Equation (10)) in absolute-value-before-addition calculating block 205 in FIG. 14.

$$Ia2 = \sqrt{(Iq^2 + Id0^2)} \tag{10}$$

In step 15-3, value Tc of the temperature sensor is compared with threshold Tcth of the temperature sensor. If value Tc of the temperature sensor is less than threshold Tcth of the temperature sensor, step 15-4 is performed. If value Tc of the temperature sensor is not less than threshold Tcth of the temperature sensor, step 15-7 is performed.

In step 15-4, Ia2 calculated in step 15-2 is compared with threshold Iath2 of an absolute value of electric current. If Ia2 is less than Iath2, step 15-5 is performed. If Ia2 is not less than Iath2, step 15-7 is performed.

Figure 16:
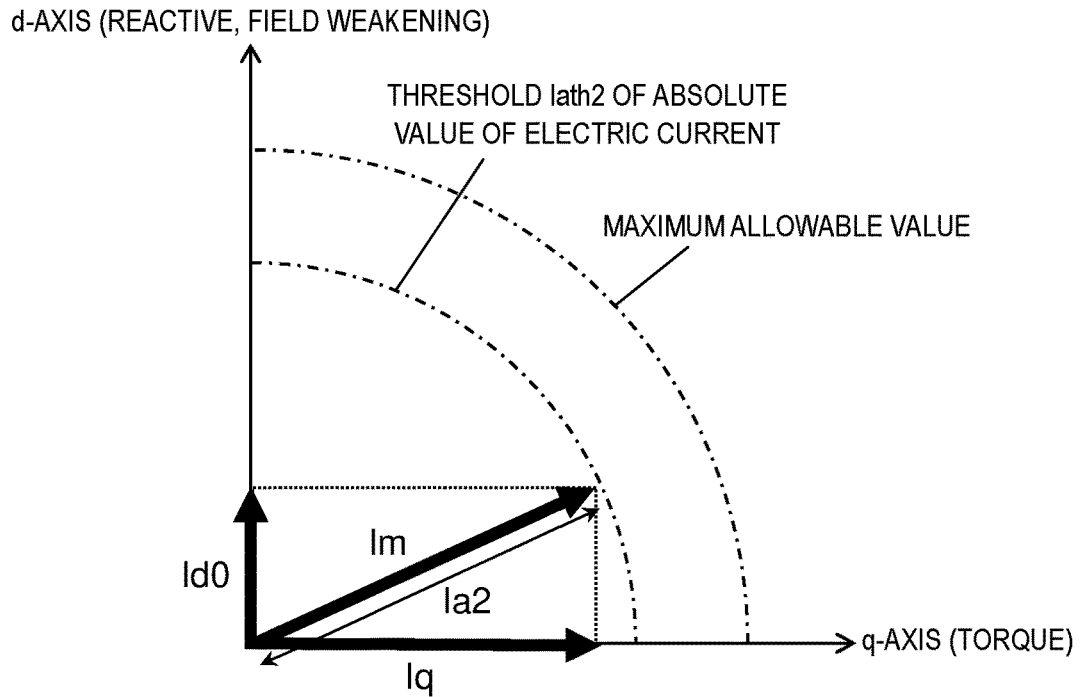
FIG. 16 illustrates electric current vectors when Ia2<Iath2 is satisfied.

FIG. 16 illustrates electric current vectors. In FIG. 16, absolute value Ia2 of motor command electric current Im before addition of d-axis electric current is less than threshold Iath2 of an absolute value of electric current. In step 15-4, it is ascertained that, even if value Id1A of addition of d-axis electric current that will be describe later is added to motor command electric current Im before addition of d-axis electric current, absolute value Ia of motor command electric current Im does not exceed a maximum allowable value.

Next, in step 15-5, value OLdet of detected overload is compared with second threshold OLth2 of overload. Value OLdet of detected overload is calculated in overload detecting block 204 in FIG. 13. If value OLdet of detected overload is less than second threshold OLth2 of overload, step 15-6 is performed. If value OLdet of detected overload is not less than second threshold OLth2 of overload, step 15-7 is performed. Second threshold OLth2 of overload is lower than first threshold OLth of overload.

In step 15-6, value Id_addA assigned to a value of addition of d-axis electric current is assigned to value Id1A of addition of d-axis electric current.

On the other hand, in step 15-7, "zero" is assigned to value Id1A of addition of d-axis electric current.

Steps 15-3 to 15-7 are performed in d-axis-addition determining second-block 202 in FIG. 14.

In step 15-8, motor command electric current Im is calculated using Equation (11) as follows:

$$Im = Iq + j \times (Id0 + Id1A) \tag{11}$$

Figure 17:
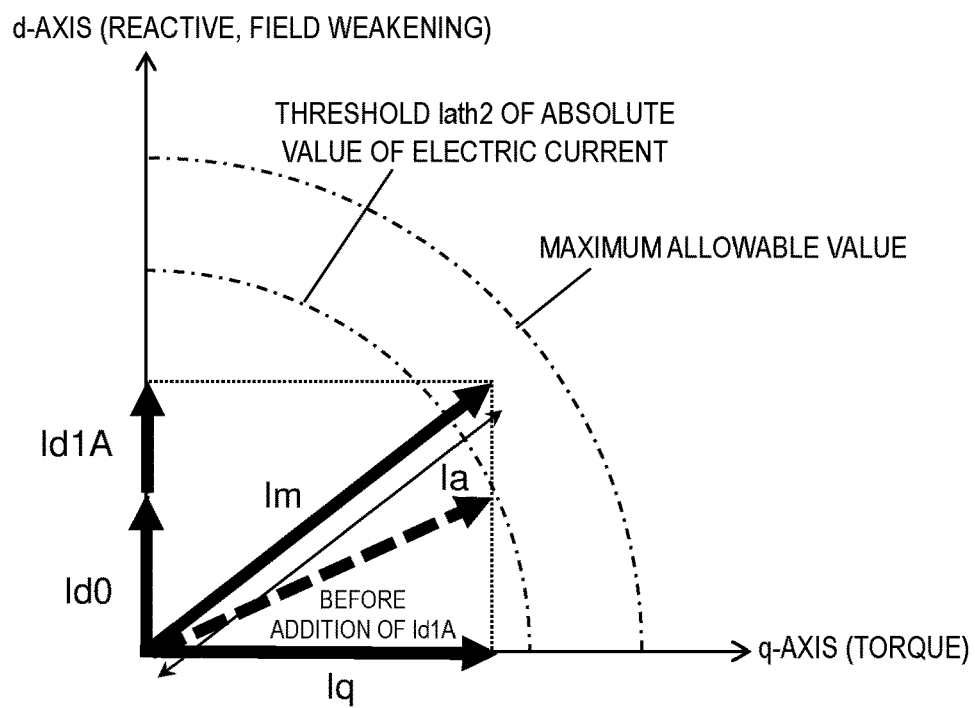
FIG. 17 illustrates vectors of motor command electric current Im according to the present exemplary embodiment.

FIG. 17 illustrates motor command electric current Im calculated using Equation (11). Although Id1A is added to FIG. 16 in FIG. 17, absolute value Ia of motor command electric current Im does not exceed the maximum allowable value.

Next, detection of overload according to the present exemplary embodiment will be described with reference to FIG. 18. Supposing a condition (Tc<Tch) in step 15-3 is always satisfied.

Figure 18:
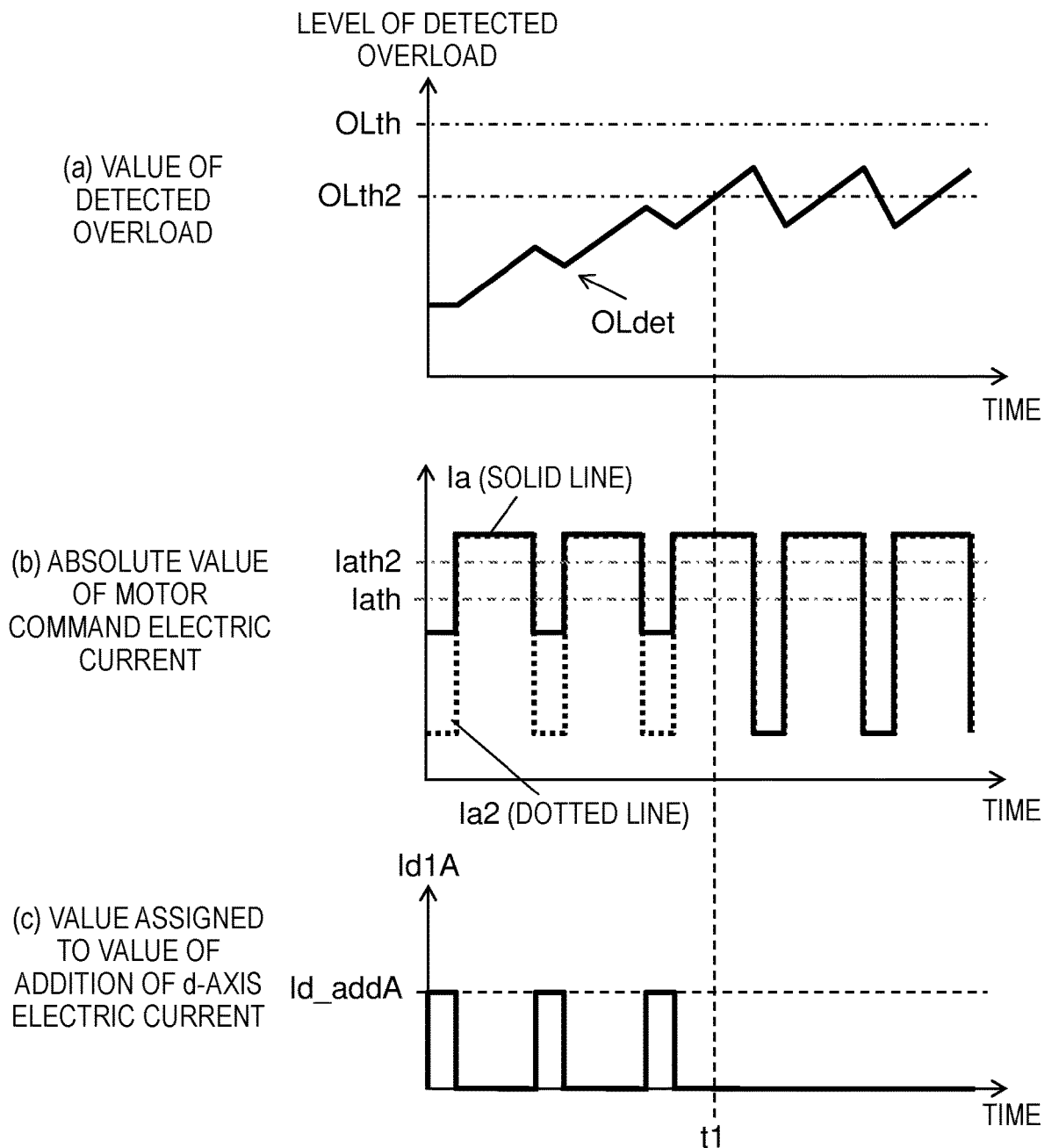
FIG. 18 illustrates detection of overload according to the present exemplary embodiment, (a) illustrates change in value of detected overload over time, (b) illustrates change in absolute value of motor command electric current over time, (c) illustrates change in value assigned to a value of addition of d-axis electric current over time.

As shown in FIG. 18, (a) represents a value of detected overload, (b) represents an absolute value of motor command electric current, and (c) represents a value assigned to a value of addition of d-axis electric current. Hereinafter, a case is exemplified in which a condition (OLdet<OLth2) in step 15-5 is satisfied until time t1.

While a condition (Ia2<Iath2) in step 15-4 is satisfied until time t1, processes in steps 15-6 and 15-8 are performed, and thus d-axis electric current is added. Therefore, increase in value OLdet of detected overload calculated in Equation (5) is highly probable, and thus value OLdet of detected overload tends to increase generally until time t1.

The condition in step 15-5 becomes unsatisfied at time t1. Then Id1A=0 is satisfied in step 15-7, and thus d-axis electric current is not added. Therefore, tendency for addition of d-axis electric current to increase value OLdet of detected overload ends, and thus value OLdet of detected overload is not allowed to exceed first threshold OLth of overload. That is, wrong overload detection is not allowed to occur.

As described above, a robot control method according to the present exemplary embodiment controls motion of a robot arm by using servo motors connected to reduction gears, and includes: determining whether temperature is less than or equal to a predetermined value; determining whether an absolute value of a motor electric current command is less than or equal to a predetermined value; determining whether a level of detected overload is less than or equal to a predetermined value; and adding d-axis electric current.

The second to fifth servo controllers of robot controller 62 in FIG. 2 each have similar configurations as first servo controller 65 described with reference to FIGS. 13 to 17 and, (a) to (c) of FIG. 18. Therefore, the second to fifth servo controllers will not be described.

INDUSTRIAL APPLICABILITY

A robot control method according to the present disclosure makes a motor generate heat to decrease viscous friction of grease for reduction gears at low temperature without demagnetizing a magnet of the motor and causing wrong overload. Therefore, the robot control method according to the present disclosure is usefully applied to industrial robots, such as welding robots.

REFERENCE MARKS IN THE DRAWINGS

5: position proportional gain
6: position control block
8: velocity proportional gain
9: velocity integral gain
10: velocity control block
18: block that illustrates motor and external forces
32: derivative element
51: encoder
52: encoder
53: reduction gears
61: robotic mechanism
62: robot controller
63: controls and display
64: main controller
65: servo controller
66: motor
100: d-axis-electric-current adding zeroth-block
102: field weakening block
104: d-axis-addition determining first-block
150: d-axis-electric-current adding first-block
200: d-axis-electric-current adding second-block
202: d-axis-addition determining second-block
204: overload detecting block
205: absolute-value-before-addition calculating block
$\omega m$: motor velocity feedback
$\theta com$: position command
$\theta m$: position feedback
$\theta L$: output position from which reduction gears output
$\omega com$: velocity loop command
Im: motor command electric current
$\tau m$: torque generated by motor
$\tau dyn$: dynamic torque (sum of gravity torque, inertial force, centrifugal force, and Coriolis force)
$\tau \mu$: dynamic friction torque
$\tau dis$: collision torque
Tc: value output from temperature sensor
Iq: motor torque electric current command
Id0: field weakening electric current command
Id1: value of addition of d-axis electric current
Ia: absolute value of motor command electric current Im
Ia2: absolute value of motor command electric current Im before addition of d-axis electric current
Iath: threshold of electric current of detection of overload
Iath2: threshold of absolute value of electric current (for determination of addition of d-axis electric current)
Id1A: value of addition of d-axis electric current
Id_addA: value assigned to value of addition of d-axis electric current
OLdet: value of detected overload
OLth: first threshold of overload (for determination of overload)
OLth2: second threshold of overload (for determination of addition of d-axis electric current)

The invention claimed is:

1. An apparatus for controlling motion of a robot arm, the apparatus comprising:
a temperature sensor that measures a temperature; and
a servo controller that
determines whether the temperature is less than or equal to a first predetermined value,
determines whether an absolute value of a motor electric current command is less than or equal to a second predetermined value if the temperature is less than or equal to the first predetermined value,
determines whether a value of a detected overload is less than or equal to a third predetermined value if the absolute value of the motor electric current command is less than or equal to the second predetermined value, and
adds a d-axis electric current to the motor electric current command if the value of detected overload is less than or equal to the third predetermined value, and
controls the motion of the robot arm using the motor electric current command after the d-axis electric current is added to the motor electric current command.

* * * * *